Patented Nov. 11, 1924.

1,515,105

UNITED STATES PATENT OFFICE.

JAMES GLENNON, OF ROCHESTER, MINNESOTA.

DIRIGIBLE HEADLIGHT.

Application filed January 25, 1924. Serial No. 688,540.

*To all whom it may concern:*

Be it known that I, JAMES GLENNON, a citizen of the United States, residing at Rochester, in the county of Olmsted and State of Minnesota, have invented a new and useful Dirigible Headlight, of which the following is a specification.

This invention relates to a dirigible headlight and is designed more particularly as an improvement upon the structure disclosed in Patent No. 1,377,880, issued to me on May 10th, 1921.

One of the objects of the invention is to provide simple and efficient means for transmitting motion to the headlights when the front wheels of the vehicle are turned, whereby the headlights are swung to the right or to the left for the purpose of illuminating the path into which the machine is turning.

A further object is to provide a connection between the steering mechanism and the headlights or lamps, which is capable of a slight lost motion so that while the machine is being driven forward a slight lateral swinging of the front wheel is permitted without a corresponding movement of the headlights.

A further object is to provide effective means for promptly returning the lights to their normal or straight forward positions when the front wheels of the vehicle begin to swing back toward the position from which they were moved, thus avoiding any undesirable effects resulting from the lost motion connection.

A still further object is to provide means whereby the connection between the steering mechanism and the headlights can be broken during the day time or whenever it is not desired to shift the headlights.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a front elevation of the dirigible headlight mechanism applied to an automobile, the distant portions of the automobile being removed and one of the mud guards being broken away.

Fig. 2 is a plan view of the dirigible headlight mechanism, the vertical slight connection between the headlights and the steering mechanism being shown in horizontal section on the line 2—2, Fig. 1.

Fig. 3 is an enlarged rear elevation of a portion of the mechanism of the apparatus.

Fig. 4 is a section on line 4—4, Fig. 3.

Fig. 5 is a section on line 5—5, Fig. 4.

Fig. 6 is a side elevation of one of the headlights, its base, and that portion of the operating mechanism therein being shown in section.

Fig. 7 is a detail view of the tripping lever.

Referring to the figures by characters of reference A designates the front axle of an automobile having the usual knuckles B, the spindles C of which are supported by the front wheels D. A portion of the vehicle body has been shown at E and is mounted on springs F in the usual way. The front mud guards have been indicated at G. Extending rearwardly from the knuckles B carrying the spindles C are arms H connected by a cross rod I and another rod J connects this rod I to the steering shaft, not shown. The mechanism thus far described is the same as that found on most automobiles and does not, in itself, constitute any part of the present invention.

Mounted at the sides of the body E on any suitable supports provided therefor are the bases 1 of the housings 2 of the headlights, each of these housings being provided with a pivot stem 3 journaled within a standard 4 projecting upwardly from one of the bases 1. A crank arm 5 is secured to the lower end of each stem 3, there being a longitudinal slot 6 in each crank arm for the reception of a pin 7 upstanding from a slide 8. The slide is mounted within a groove 9 formed in the base 1 and the walls of the groove are preferably undercut so as to hold the slide against upward displacement. The slides in the two bases are secured to the cross rod 10 which projects laterally beyond one side of the body E and is provided with a head 11 at the projecting end. This head is slidable vertically within an elongated housing 12 and a slot 13 is formed in the housing to allow up and down movement of the rod 10. As shown particularly in Figs. 2 and 4 the housing is formed of a base member 14 and a cover member 15, the two being detachably connected by bolts 16 or in any other suitable manner. Thus it will be seen that with the housing fixed relative to the axle A, it is possible for the body E and the parts connected thereto to move upwardly and downwardly without breaking the connection between the housing and the rod 10.

Secured to one end portion of the axle A is a bracket 17 adapted to be held in place by a U-bolt 18 and a threaded bolt 19 engaging the axle. Obviously, however, any other fastening means can be used. This bracket has an integral body 20, the top portion of which is grooved along a line extending parallel with the longitudinal axes of the axle A, the groove being shown particularly at 21 in Figs. 4 and 5. A cover plate 22 serves to conceal the groove and is detachably secured on the body. Slidably mounted within this groove is a block 23 from which extends a pin 24 slidable within a slot 25 in one side wall of the groove 21. This pin is integral with or fixedly secured to the back or body portion 14 of the housing 12 and is held against rotation within the block 23 by a set screw 26 or the like.

A shaft 27 is journaled within the body and extends rearwardly therefrom, there being a recess 28 in the body and opening upwardly into groove 21. A crank arm 29 is secured to the shaft 27 and is mounted to swing within the recess 28, the upper end of this arm being in engagement with the block 23 so that when the shaft is rotated back and forth the arm will produce a back and forth sliding movement of block 23 and a corresponding lateral sliding movement of the housing 12. This will result in rod 10 shifting the crank arms 5 simultaneously so that the two housings 2 will be simultaneously turned to the right or to the left.

Secured to the shaft 27 so as to rotate therewith is an arm 30 radially disposed within and formed integral with or secured to the ring 31 concentric with the shaft. Thus this ring will rotate with the shaft. Projecting into the ring from the back face of the body 20 is a segment 32 to the opposite end portions of which are connected springs 33. An elongated arcuate loop 34 is extended from each side of the arm 30, these loops being located within the space surrounded by the ring 31 and being attached to the respective springs 33. Thus it will be seen that the springs and loops cooperate to hold the arm 30 in a substantially vertical position at which time the crank arm 29 is in its intermediate position with the slide 23 centrally disposed as shown in Fig. 5.

Projecting rearwardly from the jaw 31 adjacent the lower portion thereof are spaced lugs 35 and pivotally mounted on the segment 32 so as to be supported between these lugs is a tripping lever 36 having oppositely extending grooved fingers 37 and a downwardly extending fork 38.

Loosely mounted on the shaft 27 so as to rotate freely thereon is an arm 39 on which is slidably mounted a plunger 40 having a head 41 at its outer end. A spring 42 bears against this arm and against the head 41 so as to hold the plunger normally retracted through an opening 43 formed in the ring 31 midway between the lugs 35. Any suitable means, such as a nut 44 can be used for holding the plunger 40 projected into the opening 43 with spring 42 under compression. A leaf spring 45 is carried by the ring 31 and has a node or projection 46 adapted to be seated in a recess 47 in the body 20, thereby to hold the ring against accidental movement.

A link 48 is connected to the lower end of the arm 39 and is pivotally attached at 49 to an angular arm 50 extending from the rod I.

It is to be understood that under ordinary conditions the plunger 40 is disengaged from the ring 31 as shown in Fig. 4. Thus when the steering mechanism of the vehicle is operated the arm 39 actuated thereby will swing freely on the shaft 27 without changing the positions of the lamp housings. At this time the spring 45 holds the ring 31 and the parts operatively connected thereto against accidental movement. The slidable connection provided by the housing 12 and the plug or slide 11 will allow the body of the vehicle to move upwardly and downwardly upon its springs and relative to the axle A without breaking the connection between the lamp housings and their operating means.

When it is desired to couple the lamp housing and the steering mechanism, the plunger 40 is forced into the opening 43 and fastened by any suitable means such as a set screw 44. Thus when the steering mechanism is operated, motion will be transmitted from the rod I and arm 50 through link 48 to arm 39. When the arm is swung to the right a corresponding rotation of ring 31 will be set up and the lever 36 will be tilted by the pressure of a boss 51 formed on the arm 39 and projecting into the fork 38. Plunger 40 is slidable in its boss as shown in Fig. 4. When the lever 36 is thus tilted, it moves to a position where it will not obstruct the movement of the lugs 35.

The opening 43 in ring 31 is elongated so that its length is greater than the diameter of the plunger 44. This is done so that while a vehicle is being driven along a straight road, it will be possible for the front wheels to be turned slightly to the right or to the left without turning the headlights. In other words the elongated opening provides a small amount of lost motion in the connection between the steering mechanism and the headlights. Lost motion is undesirable, however, when a vehicle is being straightened out in a road after making a turn. Under such conditions it is necessary for the safety of the driver that the headlights be promptly thrown into the direction in which the vehicle is traveling. It is for this purpose that the lever 36 and the lugs 35 have been provided. When the steering mechanism begins to turn back after the vehicle has made a turn, the plunger 40 will move longitudinally of the opening 4 and ordinarily would not actuate the lamp mechanism. With the structure described, however, as soon as the arm 39 begins its return swinging movement, the boss 51 will actuate fork 38 and cause the depressed arm or finger 37 of the lever to flick upwardly against the lug 35 in the path thereof with the result that said lug will be shifted by the lever and cause ring 31 to rotate. Consequently the lamps will be restored promptly to their normal positions, this movement being accelerated by the springs 33. When the lamps are brought to normal positions the node 46 will snap into the recess 47 and hold the parts against accidental displacement. Obviously when the vehicle is turned in the opposite direction, the operation hereinbefore described will be repeated.

What is claimed is:—

1. The combination with a structure including a slide, a housing movable with the slide, a lamp housing mounted for swinging movement, and means slidably engaged by the housing for rotating the lamp housing, of a shaft for actuating the slide, steering mechanism, a swinging connection between the steering mechanism and the shaft, a member secured to the shaft for rotation therewith, means for attaching said connection to the member to actuate the member and shaft, said means and member providing a lost motion connection, and cooperating means upon said connection and member for imparting an abrupt movement to the member when the connection is swung in one direction.

2. The combination with a slide, a rotatable lamp housing, and means operated by the slide for shifting the housing, of a shaft for actuating the slide, a ring rotatable with the shaft, a member mounted to swing upon the shaft, means for connecting said member to the steering mechanism of a vehicle, a plunger carried by the member and insertable into the ring to provide a lost motion driving connection between said member and ring, and cooperating means upon the member and ring for imparting an abrupt motion to the ring from the member when moved toward normal position.

3. The combination with a shaft, a lamp housing mounted for rotation and means for transmitting motion to said housing from the shaft, of a ring rotatable with the shaft, an arm mounted to swing upon the shaft, means for coupling said arm to the steering mechanism of a vehicle, a plunger carried by the arm, there being an opening in the ring for the reception of the plunger to provide a lost motion connection between the arm and ring when the arm is moved from normal position, and cooperating means upon the arm and ring for imparting an abrupt movement to the ring when the arm is returned to normal position.

4. The combination with a shaft, a rotatable lamp housing, and means for transmitting motion to the housing from the shaft, of an arm mounted to swing upon the shaft, a ring rotatable with the shaft and having an opening, a plunger carried by the arm and insertable into the opening to provide a lost motion connection between the arm and ring when the arm is moved from normal position, means for connecting the arm to the steering mechanism of the vehicle, a forked lever fulcrumed adjacent the ring and having oppositely extending fingers, means on the arms for engagement with the forked lever, and means upon the ring and cooperating with the fingers for imparting an abrupt movement to the ring when the arm is returned to normal position.

5. The combination with a shaft, of a movable lamp housing, and means operated by the shaft for moving the housing, of an arm pivoted on the shaft, a ring secured to the shaft, a lost motion connection between the arm and ring for rotating the ring in one direction with the arm, cooperating means upon the arm and ring for imparting an abrupt return movement to the ring when the arm is moved to normal position, and means for yieldingly holding the ring and the parts connected thereto in normal position.

6. The combination with a shaft, a movable lamp, means for operating the lamp from the shaft, of an arm pivoted on the shaft, a connection between the arm and the steering mechanism of a vehicle, a ring secured to the shaft and having an opening, a plunger on the arm insertable into the opening to provide a lost motion connection for rotating the ring out of normal position, yielding means for holding the ring in normal position, and cooperating means upon the ring and arm for imparting abrupt movement to the ring during the return of the arm to normal position.

7. The combination with a lamp housing movably mounted, a rotatable ring, and means for transmitting motion from the ring to the housing, of yielding means for holding the ring in normal position, an arm mounted to swing relative to the ring, means for coupling the arm to the steering mechanism of a vehicle, a plunger carried by the arm, there being an opening in the ring for the reception of the plunger to provide a lost motion driving connection between the arm and ring when moved in one direction, and cooperating means upon the arm and ring for imparting an abrupt return movement to the ring when the arm is moved in the opposite direction.

In testimony that I claim the foregoing as my own, I have hereto affixed my signature in the presence of two witnesses.

JAMES GLENNON.

Witnesses:
 IRVING L. ECKHOLDT,
 JILE M. JOHNSON.